(12) United States Patent
Escandell

(10) Patent No.: US 10,975,537 B1
(45) Date of Patent: Apr. 13, 2021

(54) WAVE-ENERGY DISSIPATION SYSTEM

(71) Applicant: Marco Escandell, Hialeah, FL (US)

(72) Inventor: Marco Escandell, Hialeah, FL (US)

( * ) Notice: Subject to any disclaimer, the term of this patent is extended or adjusted under 35 U.S.C. 154(b) by 0 days.

(21) Appl. No.: 16/931,999

(22) Filed: Jul. 17, 2020

Related U.S. Application Data

(60) Provisional application No. 62/876,996, filed on Jul. 22, 2019.

(51) Int. Cl.
*E02B 3/06* (2006.01)
*E02B 3/12* (2006.01)

(52) U.S. Cl.
CPC .................................. *E02B 3/062* (2013.01)

(58) Field of Classification Search
CPC ... E02B 3/062; E02B 3/06; E02B 3/12; E02B 3/121
USPC ........ 405/21, 22, 23, 25, 26, 28, 33, 34, 35; 114/267, 294; 441/1, 35, 133
See application file for complete search history.

(56) References Cited

U.S. PATENT DOCUMENTS

| | | | |
|---|---|---|---|
| 3,022,632 A * | 2/1962 | Parks .................... | E02B 3/062 405/26 |
| 3,534,558 A | 10/1970 | Bouteiller | |
| 3,991,576 A | 11/1976 | Tazaki et al. | |
| 4,027,486 A | 6/1977 | Dougherty | |
| 4,074,497 A * | 2/1978 | Ono ........................ | E02B 3/06 405/195.1 |
| 4,130,994 A * | 12/1978 | Van Moss, Jr. ......... | E02B 3/046 405/24 |
| 4,264,233 A | 4/1981 | McCambridge | |
| 5,556,229 A | 9/1996 | Bishop et al. | |
| 5,622,449 A * | 4/1997 | Essay, Jr. .................. | E02B 3/04 405/19 |
| 5,700,108 A | 12/1997 | Bishop et al. | |
| 5,879,105 A * | 3/1999 | Bishop .................... | E02B 3/062 405/26 |
| 7,524,140 B2 | 4/2009 | Bishop | |
| 7,527,453 B2 | 5/2009 | Smith | |
| 7,572,083 B1 | 8/2009 | Bishop et al. | |
| 7,686,539 B2 | 3/2010 | Aristaghes et al. | |
| 8,256,988 B1 * | 9/2012 | Haber ..................... | E02B 3/062 405/29 |
| 8,647,014 B2 | 2/2014 | McCormick et al. | |
| 8,961,067 B1 | 2/2015 | Peng et al. | |
| 9,239,214 B2 | 1/2016 | Smith | |
| 9,976,270 B2 * | 5/2018 | Elmer ................... | E02D 13/005 |
| 2003/0190191 A1 * | 10/2003 | Clark ...................... | E02B 3/062 405/26 |

(Continued)

*Primary Examiner* — Edwin J Toledo-Duran
(74) *Attorney, Agent, or Firm* — John Rizvi; John Rizvi, P.A.—The Patent Professor

(57) ABSTRACT

A flexible and displaceable wave-energy dissipation system includes a number of wave-energy dissipating system cells arranged forming a cell-type network. The system further includes one or more anchors securing the system to a floor or foundation site beneath a water body. Each anchor can include a vertical structural element securable to a plurality of concrete platforms or caps. The system cell can include one or more wave-energy dissipating units including a respective buoy. The buoys can be height-adjustable. Chains or other flexible links may connect the buoys to the anchors in various directions. The wave-energy dissipating units, when connected to one another, create a movable, wave-energy dissipating structure.

14 Claims, 11 Drawing Sheets

(56) References Cited

U.S. PATENT DOCUMENTS

2004/0018055 A1    1/2004  Clark et al.
2005/0058509 A1    3/2005  Steinberg
2010/0107627 A1*  5/2010  Morgan .............. F03B 13/1885
                                                                   60/495

* cited by examiner

WAVE-ENERGY DISSIPATION SYSTEM

CROSS-REFERENCE TO RELATED APPLICATIONS

This application claims the benefit of U.S. Provisional Patent Application No. 62/876,996, filed on Jul. 22, 2019, which is incorporated herein by reference in its entirety.

FIELD OF THE INVENTION

The present invention relates generally to a breakwaters system, and more particularly, to a submerged or partially submerged, flexible and displaceable wave-energy dissipation system that focuses on dissipating the amplitude of water waves to reduce the energy carried by said waves before reaching a shoreline to prevent beach and/or marina erosion, all the while preserving the surrounding marine ecosystem.

BACKGROUND OF THE INVENTION

A common misconception is that water travels in waves. Contrary to popular belief, energy is what travels within the waves with the potential to travel across an entire ocean basin, if not obstructed. The formation of waves is most commonly caused by wind, and such waves caused by wind are referred to as wind-driven waves, or surface waves. This type of wave is created by the friction between the wind and surface water. As the wind blows across the water surface, whether it be a lake or an ocean, the continual disturbance provided by the wind creates a wave crest. The faster the wind speed, the longer the duration of wind, and fetch (i.e., length of the water over which a given wind has blown), the larger the wave. Waves can also be formed through the gravitational pull of the sun and moon on the earth. These waves are tides or, otherwise known as, tidal waves. The ebb and flow of waves and tides are the life force of our world's ocean.

Mankind's desire to build structures along the coastline, however, has resulted in a troubling issue for many investors, homeowners, and business owners as they have to deal with the natural erosion process caused by waves. The many types of human-built structures that can be found on the coastline, such as lighthouses, commercial shopping ports, hotels, recreational marinas, apartments, and houses all face similar difficulties. Without constant protection from the erosion process caused by waves, these human-built structures, investments, and homes could be damaged or lost for good.

As a result, there have been many attempts at mitigating the erosion process caused by waves. One common approach is through the use of rigid barriers or structures built on a coastline floor or foundation site, generally parallel to the coast, and configured to partially block the passing of waves therethrough towards the coast. Such rigid structures, however, are often costly and have a negative visual impact on the coastline, and are therefore often undesirable.

Other known wave-dissipating solutions are known as (breakwater) geotubes, a UV-stabilized geotextile, permeable fabric that is woven in the shape of a large filtering tube. The tube is equipped to retain sand, while allowing water to filter and flow. Geotubes are particularly useful in areas prone to erosion during short periods of time. The approach of using geotubes long term, however, has its drawbacks. Over an extended period of time, geotubes tend to generate ecological problems. For example, they have been found to inhibit underwater currents that generate vital movement on the sea floor, which, in turn, causes damage to the surrounding area's marine ecosystem. Geotubes are also unsuitable for large waves, and are susceptible to perforation through vandalism or overextended use. The United States Army Corps of Engineers (USACE) have predominantly considered the application of geotubes in areas that are both shallow and known for having a small tide range (i.e., minimal difference between high and low tide).

Another solution used to combat shoreline erosion is with the use of a jetty. Jetties are long structures that are built perpendicular to the shoreline and extend out into the ocean. They are typically constructed of timber, stone, concrete, or steel. However, jetties, similar to geotubes, have their own set of drawbacks. While they trap sediment on the updrift in shoreline accretion, there is corresponding shoreline erosion on the downdrift side due to the interruption in longshore transport. Jetties can also hinder recreational use of coastal areas, and can cause adverse ecological effects, not to mention the visual impact they provide to the surrounding environment.

The fact that conventional wave-limiting systems are not problem-free has led science and the industry to search for additional alternative means to combat shoreline erosion. For instance, some have tried to use a plurality of individually constrained buoys with outwardly-projecting fins configured to lessen the amplitude of the waves. Others have opted to utilize floating rigid barriers to dissipate the energy provided by waves. All of them, however, continue to have their own set of drawbacks and limitations.

Accordingly, there is a substantial need for a wave-energy dissipation system that focuses on dissipating the amplitude of water waves to reduce the energy carried by said waves before reaching a shoreline to prevent beach and/or marina erosion, all the while preserving the surrounding marine ecosystem.

SUMMARY OF THE INVENTION

The present invention is directed to a flexible and displaceable wave-energy dissipation system including a number of wave-energy dissipating system cells arranged forming a cell-type network. The system further comprises one or more anchors securing the system to a floor or foundation site beneath a water body. Each anchor can include a vertical structural element securable to a plurality of concrete platforms or caps. The system cell can include one or more wave-energy dissipating units including a respective buoy. The buoys can be height-adjustable. Chains or other flexible links may connect the buoys to the anchors in various directions. The wave-energy dissipating units, when connected to one another, create a movable, wave-energy dissipating structure.

In a first implementation of the invention, a flexible and displaceable wave-energy dissipation system comprises a plurality of wave-energy dissipation units, each wave-energy dissipation unit comprising a buoy. The system further includes at least one anchor configured to secure the wave-energy dissipation system to a floor or foundation site. The wave-energy dissipating units are movable relative to one another and relative to the at least one anchor, wherein movement of the first wave-energy dissipating units relative to one another and relative to the anchor is limited. The wave-energy dissipation units are divided into at least two groups of wave-energy dissipation units. Each group is arranged at a different distance from a front side of the wave-energy dissipation system configured to face an impacting wave train.

In a second aspect, the at least two groups of wave-energy dissipation units may include a front row of wave-energy dissipation units and a rear row of wave-energy dissipation units, with the front row arranged frontward of the rear row such that the front row is encountered by the impacting wave train before the rear row is encountered by the impacting wave train.

In another aspect, the at least two groups of wave-energy dissipation units may further include an intermediate row of wave-energy dissipation units arranged rearward of the front row and frontward of the rear row.

In another aspect, at least one wave-energy dissipation unit of the plurality of wave-energy dissipation units may be height-adjustable relative to at least another wave-energy dissipation unit of the plurality of wave-energy dissipation units to vary a relative vertical separation between the respective buoys.

In another aspect, the plurality of wave-energy dissipation units may include a first subset of wave-energy dissipation units and a second subset of wave-energy dissipation units, wherein the buoy of each wave-energy dissipation unit of the second subset may be height-adjustable relative to the buoys of the wave-energy dissipation units of the first subset.

In yet another aspect, the wave-energy dissipation system may further include a structure. Each wave-energy dissipation unit of the second subset may be carried by the structure and may be vertically translatable relative to the structure to vary a vertical position of the buoy of said each wave-energy dissipation unit of the second subset, such that each wave-energy dissipation unit of the second subset may adopt a first vertical position and a second vertical position lower than the first vertical position.

In another aspect, the buoy of each wave-energy dissipation unit of the second subset in the lower position may be arranged at a same height as the buoys of the wave-energy dissipation units of the first subset.

In another aspect, each wave-energy dissipation unit of the second subset may be configured to adopt an unlocked configuration relative to the structure. In the unlocked configuration, the wave-energy dissipation unit of the second subset may be freely translatable vertically upward or downward relative to the structure responsively to upward or downward buoyancy of the buoy of the wave-energy dissipation unit of the second subset.

In another aspect, the wave-energy dissipation unit of the second subset may be lockable in the second vertical position such that the wave-energy dissipation unit of the second subset may remain in the second vertical position counteracting buoyancy of the buoy of the wave-energy dissipation unit of the second subset.

In yet another aspect, the wave-energy dissipation units of the first subset may be non-height-adjustably connected to the structure.

In another aspect, the wave-energy dissipation units of the first subset may be secured to the floor or foundation site.

In another aspect, the wave-energy dissipation system may further include at least one flexible, elongated member extending between a first group of the at least two groups and a second group of the at least two groups. The flexible elongated member may be configured to elongate to a maximum length thereby limiting movement of the first and second groups relative to one another.

In another aspect, the flexible elongated member may include at least one catenary elongatable to the maximum length.

In yet another aspect, the plurality of wave-energy dissipation units may be formed by a plurality of cells, each cell including two or more wave-energy dissipation units.

In another aspect, the plurality of wave-energy dissipation units may be formed by a plurality of triangular cells, each triangular cell including at least three wave-energy dissipation units respectively arranged at three vertexes of the triangular cell.

In another aspect, the plurality of triangular cells may be arranged in consecutive relationship along a longitudinal direction.

In another aspect, the longitudinal direction may be generally perpendicular to a direction of displacement of the impacting wave train.

In yet another aspect, the wave-energy dissipation system may further include an energy dissipation mesh enclosing at least one buoy and configured to allow passage of the wave train therethrough.

In another implementation of the invention, a flexible and displaceable wave-energy dissipation system comprises a plurality of wave-energy dissipation units including a plurality of first wave-energy dissipation units and a plurality of second wave-energy dissipation units. Each first and second wave-energy dissipation unit comprises a respective buoy. Each second wave-energy dissipation unit is height-adjustable relative to the first wave-energy dissipation units to vary a relative vertical separation between the buoy of the second wave-energy dissipation unit and the buoys of the first wave-energy dissipation units. The system further includes at least one anchor configured to secure the wave-energy dissipation system to a floor or foundation site. The first and second wave-energy dissipating units are movable relative to one another and relative to the at least one anchor, wherein movement of the first wave-energy dissipating units relative to one another and relative to the anchor is limited. The plurality of wave-energy dissipation units is divided into at least two groups of wave-energy dissipation units. Each group is arranged at a different distance from a front side of the wave-energy dissipation system configured to face an impacting wave train. Furthermore, the at least two groups of wave-energy dissipation units comprise a front row of wave-energy dissipation units, a rear row of wave-energy dissipation units and an intermediate row of wave-energy dissipation units. The front row is arranged frontward of the intermediate row and the intermediate row is arranged frontward of the rear row such that the front row is encountered by the impacting wave train before the intermediate row is encountered by the impacting wave train, and such that the intermediate row is encountered by the impacting wave train before the rear row is encountered by the impacting wave train.

In yet another implementation of the invention, a flexible and displaceable wave-energy dissipation system comprises a plurality of wave-energy dissipation units including a plurality of first wave-energy dissipation units and a plurality of second wave-energy dissipation units. Each first and second wave-energy dissipation unit comprises a respective buoy. Each second wave-energy dissipation unit is height-adjustable relative to the first wave-energy dissipation units to vary a relative vertical separation between the buoy of the second wave-energy dissipation unit and the buoys of the first wave-energy dissipation units. The system further includes a structure, and at least one anchor, wherein the anchor is configured to secure the wave-energy dissipation system to a floor or foundation site. The first and second wave-energy dissipating units are movable relative to one another and relative to the at least one anchor. Movement of the first wave-energy dissipating units relative to one another and relative to the anchor is limited. The plurality of wave-energy dissipation units is divided into at least two groups of wave-energy dissipation units. Each group is arranged at a different distance from a front side of the wave-energy dissipation system configured to face an impacting wave train. The at least two groups of wave-energy dissipation units comprise a front row of alternating first and second wave-energy dissipation units, a rear row of alternating first and second wave-energy dissipation units and an intermediate row of second wave-energy dissipation units. The front row is arranged frontward of the intermediate row and the intermediate row is arranged frontward of the rear row such that the front row is encountered by the impacting wave train before the intermediate row is encountered by the impacting wave train, and such that the intermediate row is encountered by the impacting wave train before the rear row is encountered by the impacting wave train. The front row and rear row are secured to the floor or foundation site by the at least one anchor, and the structure is connected to the front and rear row and carries the intermediate row. The wave-energy dissipation units of the front, intermediate and rear rows form a triangular-cell pattern, each triangular cell comprising six wave-energy dissipation units respectively arranged at a first vertex of the triangular cell, a second vertex of the triangular cell, a third vertex of the triangular cell, a first intermediate position on a first side of the triangular cell between the first and second vertexes, a second intermediate position on a second side of the triangular cell between the second and third vertex, and a third intermediate position on a third side of the triangular cell between the first and third vertexes. The wave-energy dissipation units of the first, second and third intermediate positions form the intermediate row, and the wave-energy dissipation units of the first, second and third vertexes form the front and rear rows.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
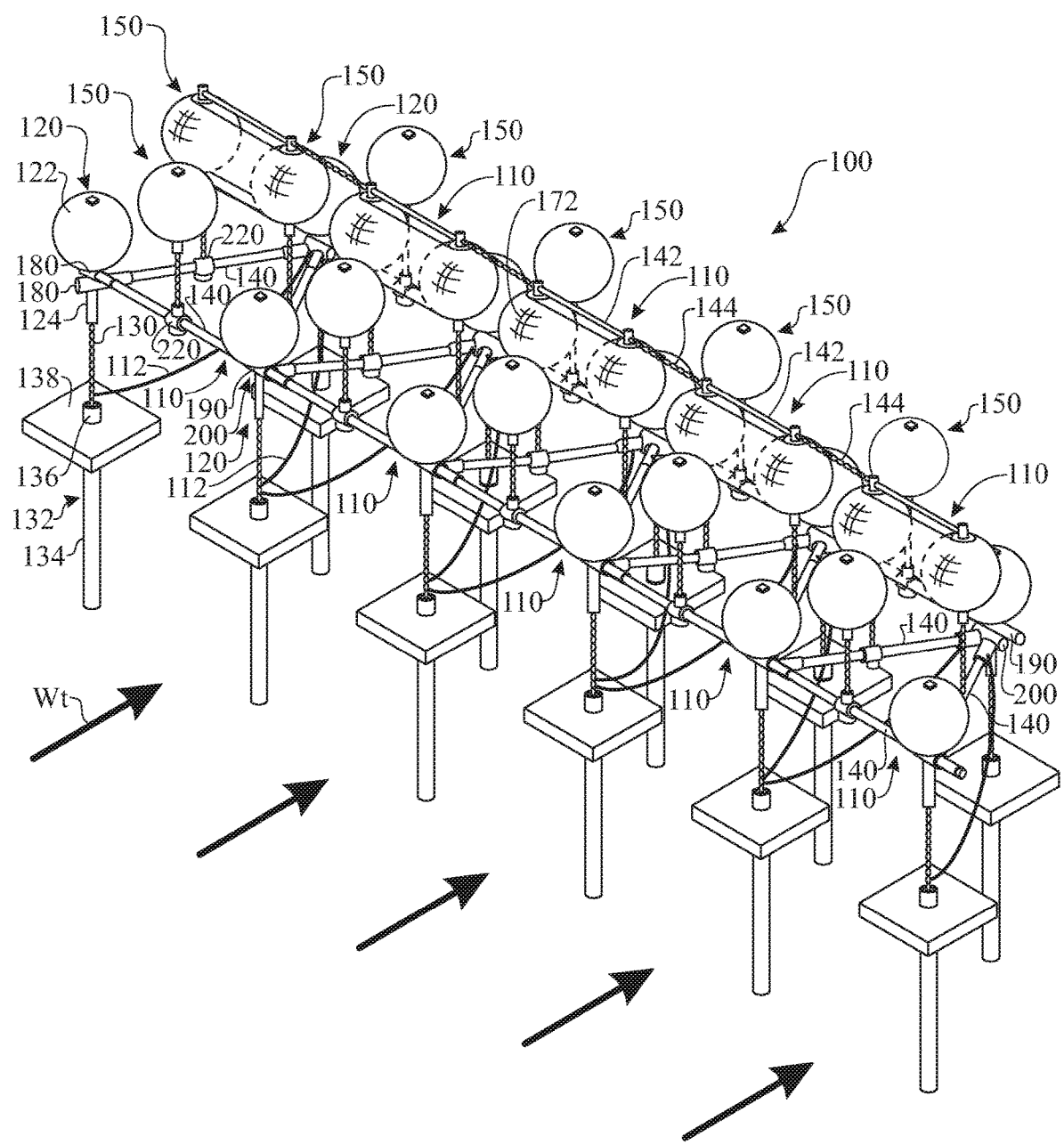
FIG. 1 presents a top front perspective view showing an exemplary embodiment of the flexible and displaceable wave-energy dissipation system, the system formed by a plurality of triangular system cells including several wave-energy dissipation units.

Referring now to the various figures of the drawings, wherein like reference characters refer to like parts, there is shown in FIG. 1 an exemplary embodiment of a flexible and displaceable wave-energy dissipation system (hereinafter referred to as "system"), generally referenced as reference 100. Although the system 100 can be modified to engage waves of different amplitudes and lengths, the system 100 shown in the drawings is configured to focus on interacting with waves that are approximately 1 to 8 min height. One of the principal characteristics of the system 100 is the system's ability to propagate and absorb the energy carried by a wave train. Unlike alternative wave-dissipation systems, which are designed to confront or displace waves, the system 100 is configured to move in the same direction as the wave train to create a drag force, or friction, that facilitates the transfer of some of the energy of the wave train to the system 100. By reducing the wave energy that reaches the shoreline, the likelihood and/or extent of shoreline erosion is reduced.

Figure 2:
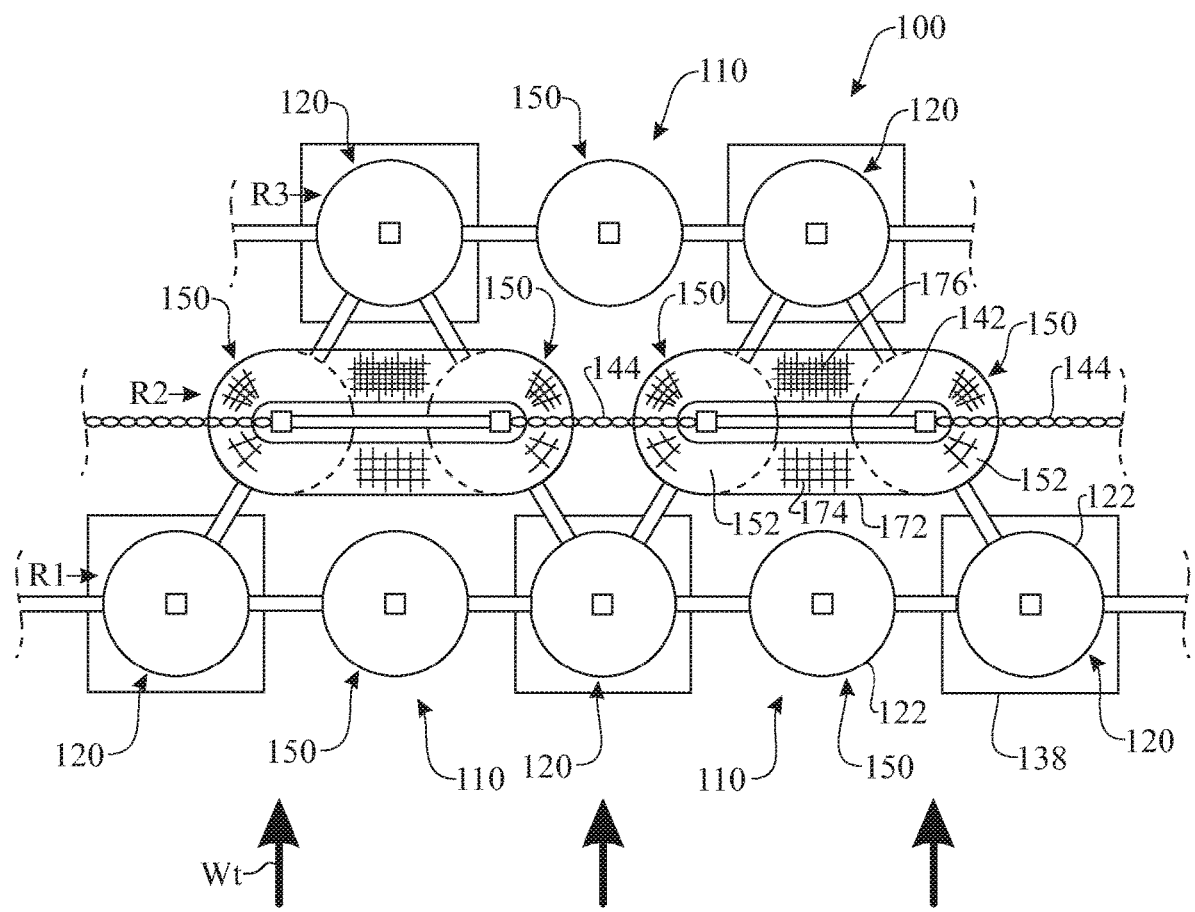
FIG. 2 presents a top plan view of the wave-energy dissipation system of FIG. 1, illustrating how the triangular system cells are interconnected to form a cell-type network.

Referring now to accompanying FIGS. 1-11, and more particularly to FIG. 1, the system 100 may be broken down into a plurality of structures which are subsequently and adjacently organized to form a cell-type arrangement or network. Throughout the present disclosure, such structures will be referred to as system cells 110. In other words, the system 100 is formed of a plurality of system cells 110 forming a cell-type network. In some embodiments, such as the present embodiment, each system cell 110 is generally triangularly shaped, if observed in top plan view, as best shown in FIG. 2, which shows three adjacent system cells 110. However, alternative system cell shapes, such as, square, pentagonal, hexagonal, etc., may also be used. In yet further embodiments, different system cell shapes may be included; for instance, the system may include a combination of triangular system cells and hexagonal system cells.

Figure 3:
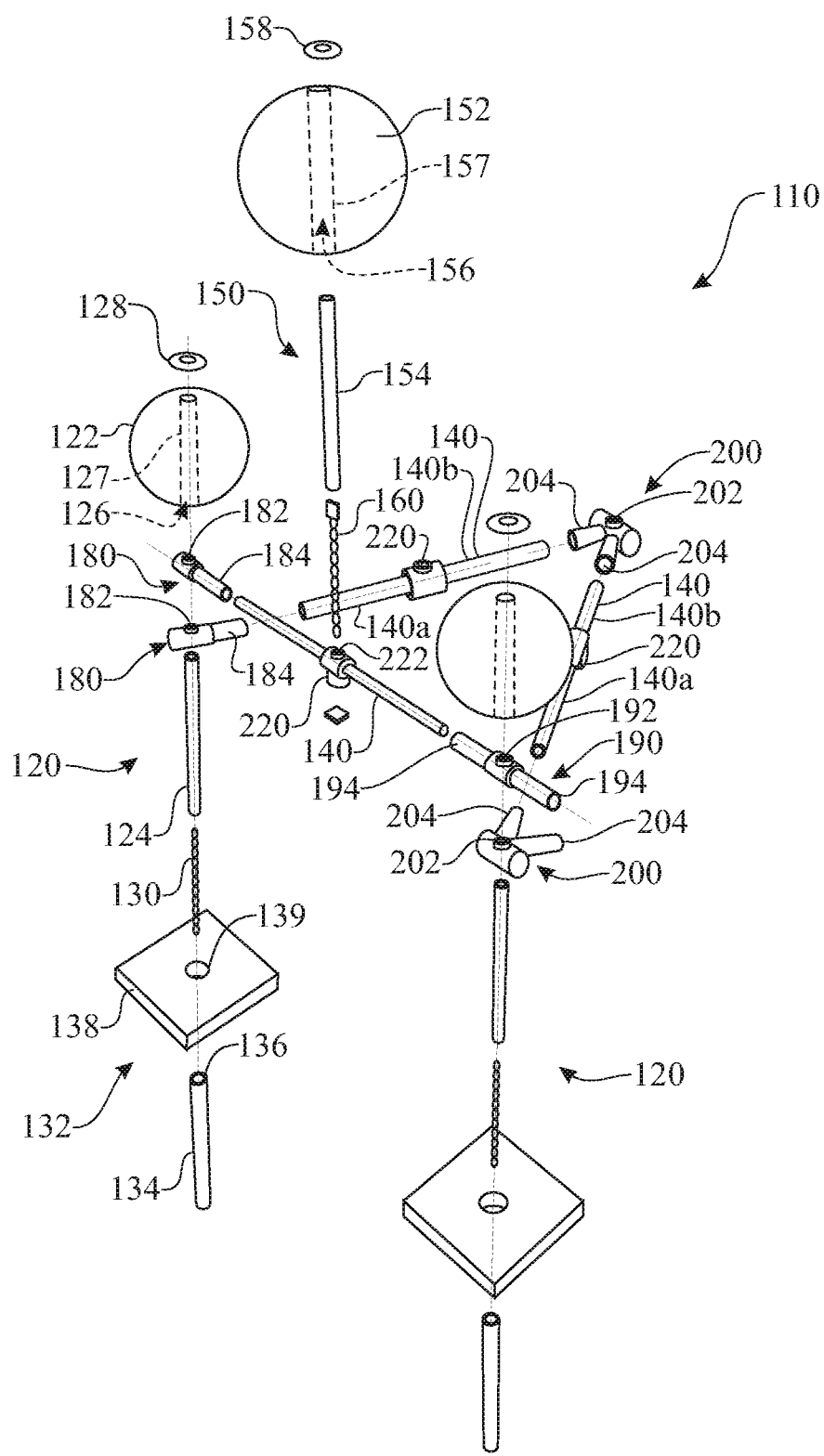
FIG. 3 presents an exploded view of a single system cell that is part of the wave-energy dissipation system originally illustrated in FIG. 1.

The illustration of FIG. 3 presents one of the aforementioned system cells 110 in exploded view. As shown in FIG. 3 and also in FIGS. 1-2, the system cell 110 comprises a set of one or more wave-energy dissipation units, and preferably two or more wave-energy dissipation units interconnected to one another to create the aforementioned system cell 110. For example, the system cell 110 of the present embodiment includes three first wave-energy dissipation units 120 arranged in a triangular configuration, i.e. located at the three vertexes of an imaginary triangle (it should be noted that, for clarity purposes, only two of the three first wave-energy dissipation units 120 are shown in FIG. 3). The three first wave-energy dissipation units 120 are interconnected to one another by linking bars, beams or other elongated linking members, which, in the present embodiment, are arranged generally horizontally and hereinafter referred to as horizontal members 140. In preferred embodiments, the horizontal members 140 are rigid, such as rigid bars, rods or beams. The horizontal members 140 form a triangle, and the three first wave-energy dissipation units 120 are arranged at the triangle vertexes. The system cell 110 can further include one or more second wave-energy dissipation units 150 complementing the three first wave-energy dissipation units 120. Each second wave-energy dissipation unit 150 can be arranged at an intermediate position between two adjacent first wave-energy dissipation units 120, i.e. at an intermediate position along a side of the imaginary triangle. For instance, the system cell 110 of the present embodiment includes three second wave-energy dissipation units 150 arranged at intermediate positions along the respective three horizontal members 140. For clarity purposes, the exploded view of FIG. 3 shows one of the three second wave-energy dissipation units 150 only; however, it is to be understood that the same features apply to the remaining two second wave-energy dissipation units 150 of the triangular system cell 110.

In order to allow for the connection of the first and second wave-energy dissipation units 120 and 150 to the horizontal members 140 and to interconnect the horizontal members 140 to one another, the system cell 110 further comprises a set of nodes, knots or brackets, hereinafter referred to generally as brackets. The set of brackets can also connect each system cell 110 to one or more adjacent system cells 110. In some embodiments, such as the present embodiment, the set of brackets can include three types of brackets: a single-connector bracket 180, a first dual-connector bracket 190 and a second dual-connector bracket 200. As shown in FIG. 3, all brackets 180, 190 and 200 can include a vertical through aperture or hole 182, 192 and 202 extending through the bracket 180, 190 and 200, respectively, for purposes that will be hereinafter described. In addition, the single-connector bracket 180 includes one connector 184 configured to receive a horizontal member 140. In turn, the first dual-connector bracket 190 and second dual-connector bracket 200 include two connectors 194 and 204, respectively, each connector 194 and 204 configured to receive a horizontal member 140. In the present embodiment, the connectors 194 of the first dual-connector bracket 190 are arranged longitudinally aligned and opposed relative to one another, such that the connector 194 allows for the coupling thereto of two opposite horizontal members 140 in rectilinear alignment. In turn, the connectors 204 of the second dual-connector bracket 200 are arranged at an angle less than 90 degrees with one another (e.g., 60 degrees), such that the second dual-connector bracket 200 provides a V-shaped elbow for receiving and connecting two horizontal members 140 at an angle with one another.

Figure 10:
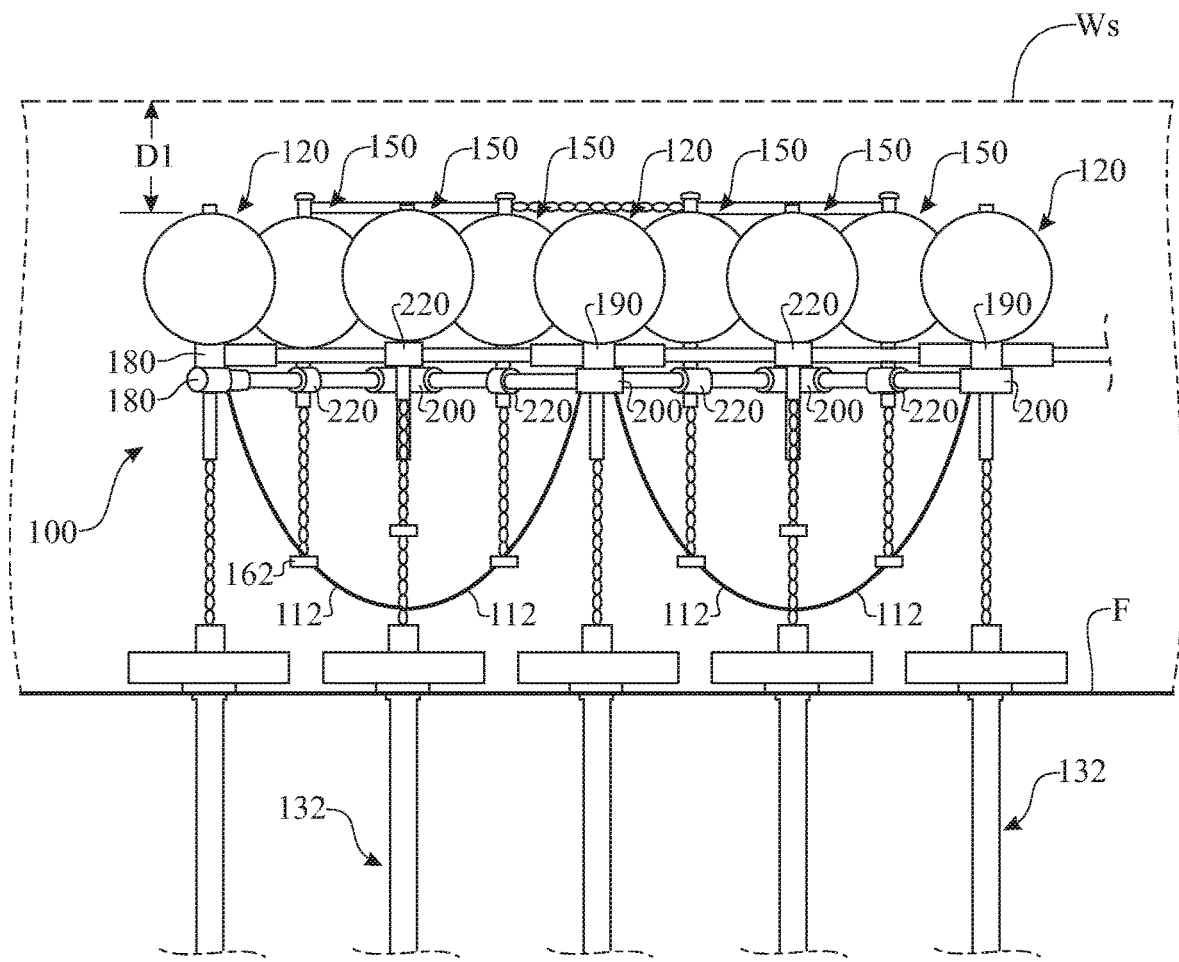
FIG. 10 presents rear elevation view of the wave-energy dissipation system as illustrated in FIG. 8.

As shown in FIGS. 1, 3 and 10 the horizontal members 140 and brackets 180, 190 and 200 form a structure, matrix or frame including three frame sub-structures. A first frame sub-structure is a zig-zagged structure provided by oblique horizontal bars 140 arranged in a zig-zagged configuration and connected one to the next, at the front and rear elbows or bents of the zig-zagged configuration, by a respective second dual connector bracket 200. A second frame sub-structure is formed by a plurality of horizontal bars 140 arranged at a front side of the structure (see FIG. 1), in axial alignment with one another, with the plurality of horizontal bars 140 interconnected by first dual-connector brackets 190 and intermediate brackets 220 (described hereinafter). A third frame sub-structure is similar to the second frame sub-structure but arranged on a rear side of the structure. As best shown in FIGS. 3 and 10, each first dual connection bracket 190 is arranged vertically stacked with a respective second dual-connector bracket 200, with the respective vertical through holes 192 and 202 arranged in vertical alignment.

As further shown in FIGS. 1 and 2, the wave-dissipation units may be arranged in rows, including: a first or front row R1 arranged facing the wave train, the front row R1 comprising alternating first wave-energy dissipation units 120 and height-adjustable, second wave-energy dissipation units 150 (shown elevated in the figure); a second or intermediate row R2, the intermediate row R2 comprising height-adjustable, second wave-energy dissipation units 150 (shown elevated in the figure); and a third or rear row R3 arranged opposite to the front row, the rear row R3 comprising alternating first wave-energy dissipation units 120 and height-adjustable, second wave-energy dissipation units 150 (shown elevated in the figure). In some embodiments, such as the depicted embodiment, the rows R1, R2 and R3 may be parallel to one another, as shown, and perpendicular to the direction of displacement of the wave train (said direction of displacement indicated by arrows and by reference Wt).

Furthermore, a corner or end system cell 110 such as that of FIG. 3 can be constructed, for instance, by assembling three horizontal members 140 to one another in triangular arrangement using two single-connector brackets 180 at an end or free vertex of the triangle, and second dual-connector brackets 200 and first dual-connector brackets 190 at the other two vertexes of the triangle in order to allow for the further connection of horizontal members 140 of the present system cell 110 and adjacent system cells 110.

As further shown in FIG. 3, the system cell 110 further includes an intermediate bracket 220 arranged at an intermediate section of each side of the triangle, and more specifically, at an intermediate section of each horizontal member 140 (or interconnecting two horizontal members to form said horizontal member 140). The intermediate bracket 220 is provided with a vertical through hole 222 for purposes that will be described hereinafter.

In some embodiments, the connection between each connector 184, 194, 204 and the corresponding horizontal member 140 allows for a longitudinal (i.e. axial) and/or rotational movement (i.e. rotation about the longitudinal axis thereof) one relative to the other. In some preferred embodiments, the horizontal member 140 has some degree or freedom of movement both axially and rotationally about the connector 184, 194, or 204 to which the horizontal member 140 is attached. In turn, the connection between the intermediate bracket 220 and the horizontal member 140 (or segments 140a, 140b thereof on each side of the intermediate bracket 220, as best shown in FIG. 3) can allow for some axial and/or rotational movement of the horizontal member 140 (or segments 140a, 140b thereof) relative to the intermediate bracket 220.

The first and second wave-energy dissipation units 120 and 150 will now be described with reference to FIG. 3. For clarity purposes, as mentioned heretofore, said figure features only two of the first wave-energy dissipation units 120 and one of the second wave-energy dissipation units 150 comprised in the system cell 110; i.e., one of the first wave-energy dissipation units 120 and two of the second wave-energy dissipation units 150 forming the system cell 110 have been omitted so as not to obscure the figure.

Figure 8:
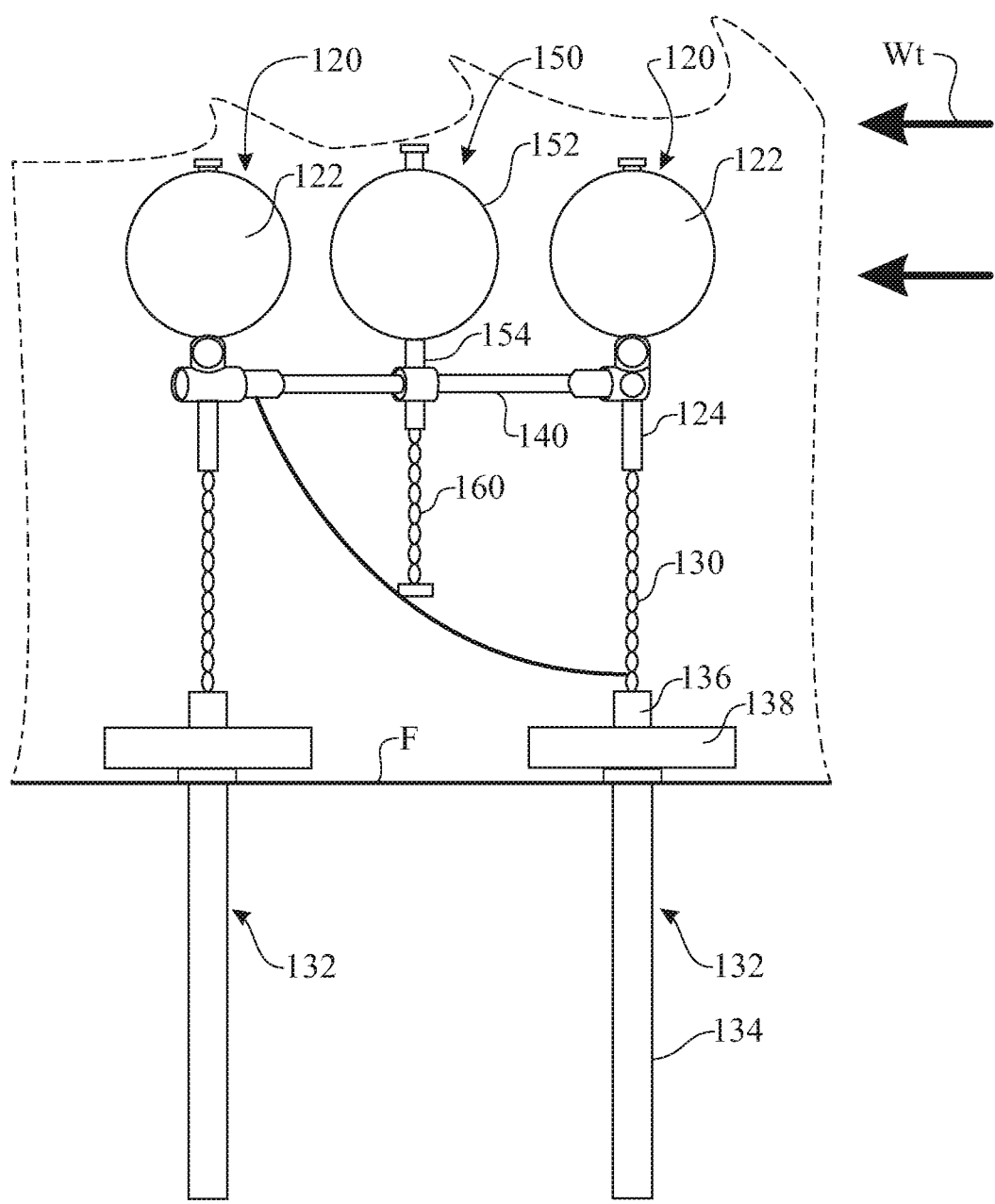
FIG. 8 presents a left side elevation view of the wave-energy dissipation system illustrated in FIG. 1, illustrating how the system behaves underwater to dissipate wave energy in relatively normal wave-height conditions, the system shown adjusted such that the second wave-energy dissipating units are in the lowered position of FIG. 4.

As shown, each first wave-energy dissipation unit 120 can include a floatable body or buoy 122 and a vertical structure, body or element 124. The buoy 122 can be made of, or comprise, a floatable material such that the buoy 122 is floatable in water, and can be constructed as a general solid body including a generally vertical through hole 126. The through hole 126 can be lined by a preferably rigid, internal hollow tube 127. In turn, the vertical element 124 can be rigid (e.g., a rigid pole or bar) and can extend through the through hole 126 of the buoy 122, and may be optionally axially and rotatably movable within the through hole 126 and relative to the buoy 122. A top end of the vertical element 124 can extend upward and outward of a top of the buoy 122 and can be connected to a cap, fastener or stopper 128 which prevents extraction of the vertical element 124 from the through hole 126 of the buoy 122 and the buoy 122 from decoupling. In turn, a bottom end of the vertical element 124 can extend outwardly and downwardly of a bottom of the buoy 122. The first wave-energy dissipation unit 120 further includes a chain, wire, cable or other flexible non-stretchable elongated element (hereinafter referred to generically as chain 130). As shown in FIGS. 1 and 8, a top end of the chain 130 can be secured to the outwardly-extending bottom end of the vertical element 124, such as by a non-corrosive fastener (not shown). The length of the chain 130 may vary; for instance, said length may depend on the distance from a foundation site F and a water surface Ws, shown in FIG. 10, which will be described in greater detail hereinafter.

With continued reference to FIG. 3, the first wave-energy dissipation unit 120 further includes an anchor 132, also shown for instance in FIG. 8, and to which a bottom end of the chain 130 of the first wave-energy dissipation unit 120 is connected. In the present embodiment, the anchor 132 is configured to secure both the first wave-energy dissipation unit 120 in particular, and the system 100 in general, to the foundation site F (FIG. 8). Each of the anchors 132 used in the system 100 may include at least one vertical structural element 134 (e.g., a piling) at least partially embedded into the foundation site F, as shown in FIG. 8, so that a top end 136 of the structural element 134 protrudes outwardly and upwardly from the foundation site F. Once the structural element 134 is embedded in the foundation site F, a cap or platform 138 may be mounted to the top end 136 of the structural element 134 to provide further stability to the anchor 132. For instance and without limitation, the top end 136 of the structural element 134 may extend through a through hole 139 (FIG. 3) formed in the platform 138 and may protrude upwardly and outwardly of the platform 138, and a bottom end of the chain 130 can be connected to said upwardly-protruding top end 136 of the structural element 134.

As further shown in FIG. 3, similarly to the first wave-energy dissipation unit 120, each second wave-energy dissipation unit 150 comprises a floatable body or buoy 152 having a through hole 156 which can be lined by a preferably rigid, internal hollow tube 157, a vertical element 154 extending through the internal hollow tube 157 and the buoy 152 and attached to a stopper 158, and a chain 160 or other flexible non-stretchable elongated linkage connected to a bottom end of the vertical element 154. Also similarly to the first wave-energy dissipation unit 120, the vertical element 154 may be axially and/or rotatably movable within the internal hollow tube 157 and thus have some freedom of axial and/or rotational movement relative to the buoy 152. However, unlike the first wave-energy dissipation units 120, the second wave-energy dissipation units 150 of the present embodiment are not secured to the foundation site F; instead, the second wave-energy dissipation units 150 are vertically-movable or height-adjustable. I.e., the vertical distance between the buoys 152 and the foundation site F can be selectively varied, such as to adapt the system 100 to different wave heights or sea roughness conditions, as will be described in greater detail hereinafter.

Figure 4:
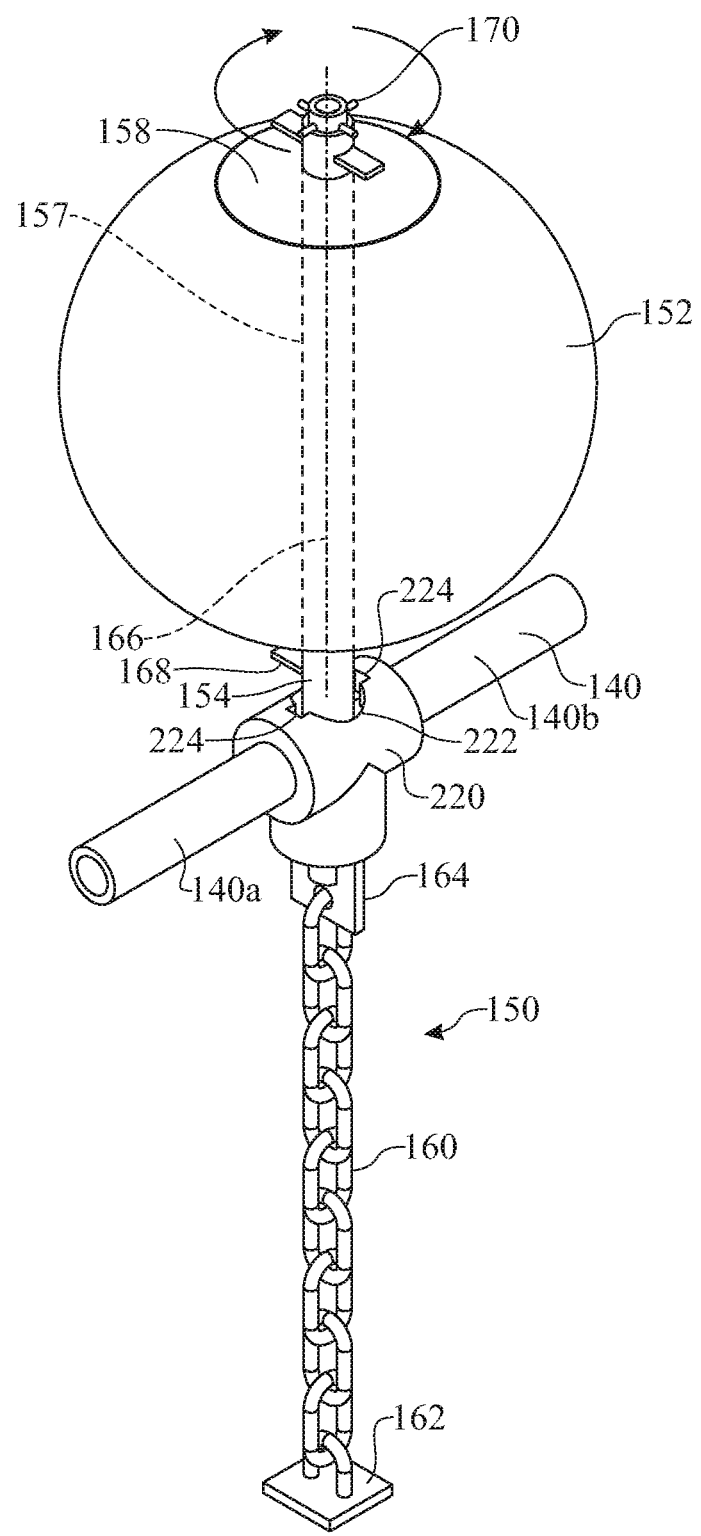
FIG. 4 presents a top perspective view of a single, height-adjustable, second wave-energy dissipation unit, shown in a locked position in which the unit is lowered and prevented from rising relative to the remainder of the system.
Figure 5:
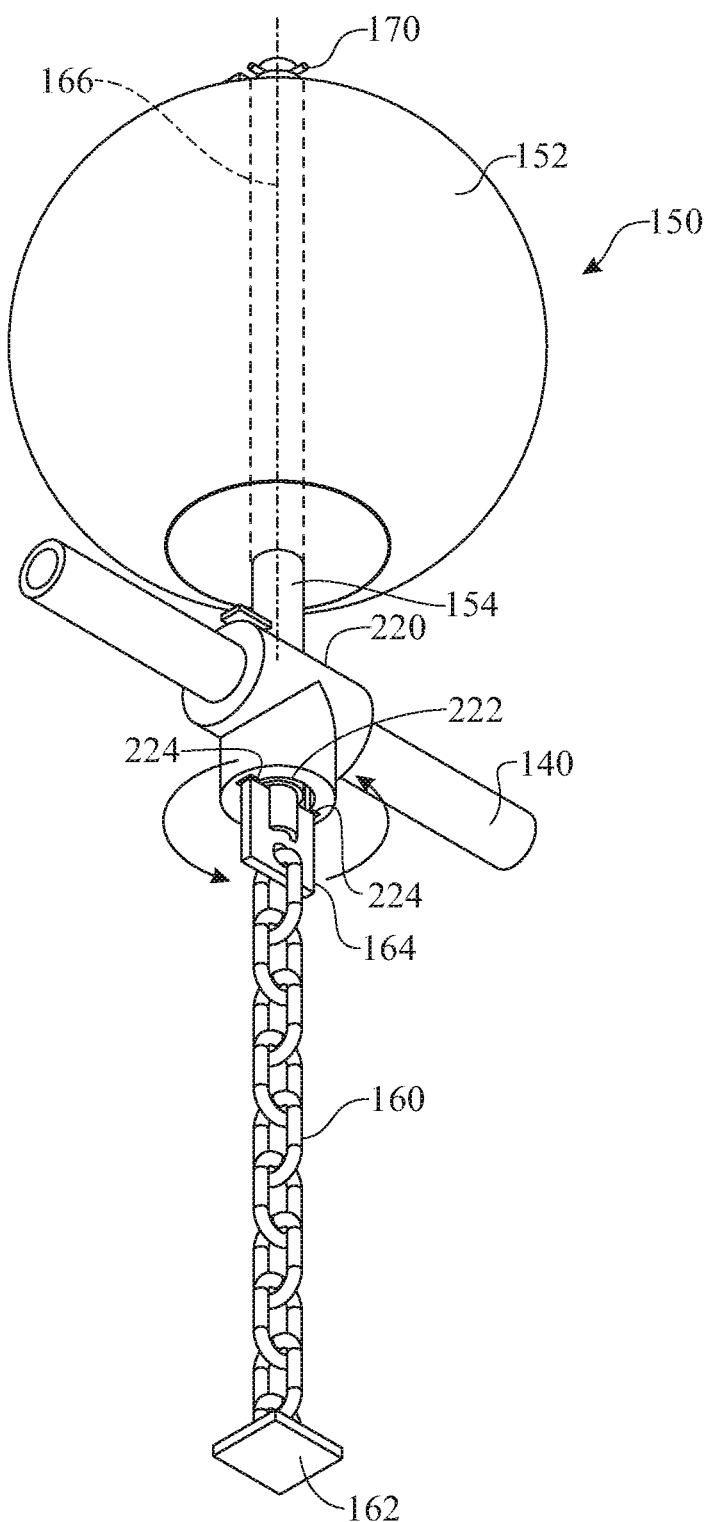
FIG. 5 presents a bottom perspective view of the second wave-energy dissipation unit originally illustrated in FIG. 4, the second wave-dissipation unit having been rotated ninety degrees to an unlocked position in which the unit is free to rise and a vertical translation of the buoy is thereby allowed.
Figure 6:
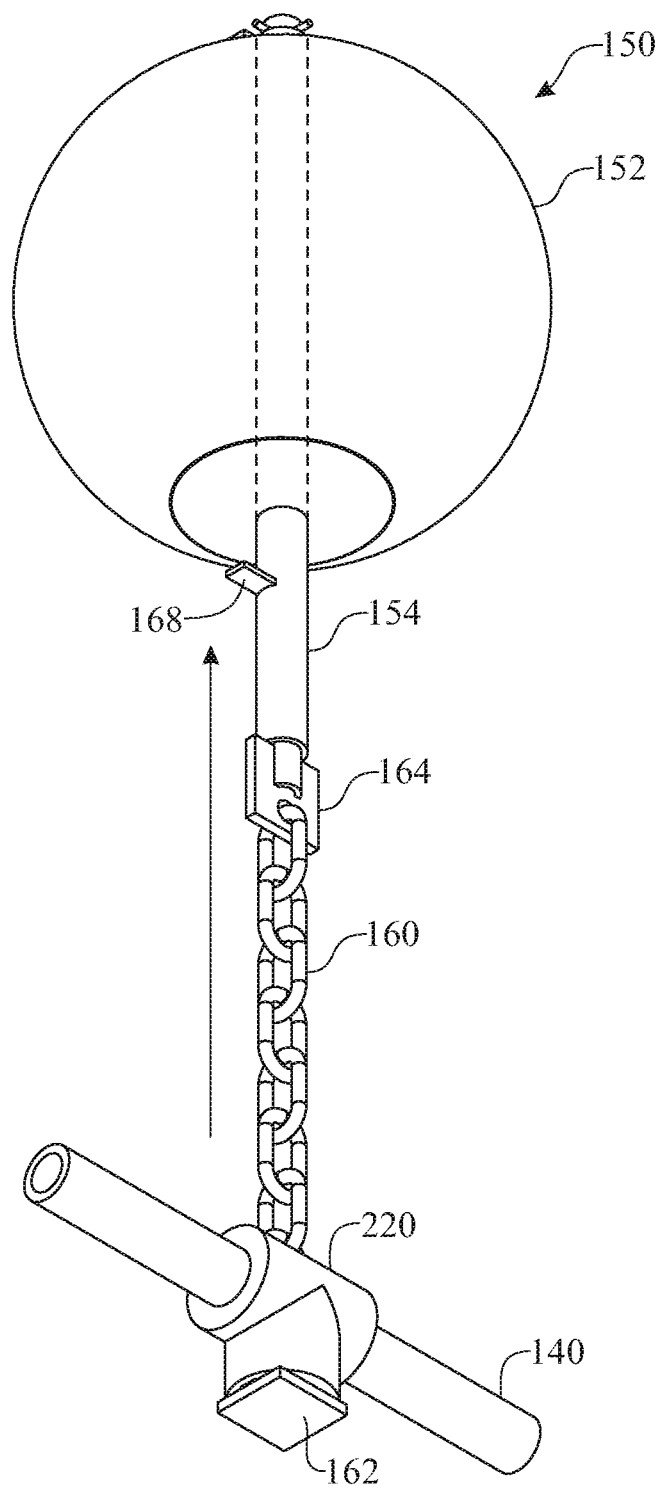
FIG. 6 presents a bottom perspective view of the second wave-energy dissipation unit illustrated in FIG. 4, with the second wave-energy dissipation unit fully risen to an elevated position.

The illustrations of FIGS. 4-6 show more detailed views of the second wave-energy dissipation unit 150. As previously stated, the second wave-energy dissipation unit 150 is coupled to horizontal member 140, an intermediate section of which is shown in the figures. As shown, and mentioned heretofore, the chain 160 is secured to the vertical element 154, which in turn extends through the internal hollow tube 157 and through the buoy 152 and is secured to the stopper 158 at the top of the buoy 152. A bottom end section of the chain 160 is coupled to a bottom stopper 162. The bottom stopper 162 can be formed, for instance, as a transverse plate extending perpendicular to a longitudinal direction of the chain 160, as shown. In turn, a top end of the chain 160 is coupled to a key element 164. The key element 164 is non-movably provided at or integrally formed with a bottom end of the vertical element 154 such that the vertical element 154 and the key element 164 are jointly rotatable relative to the intermediate bracket 220 about a rotation axis 166 which can be the same as a central longitudinal axis of the vertical element 164. The key element 164 can be formed, for instance, as a plate arranged parallel to, and preferably comprising, the rotation axis 166, and perpendicular to the bottom stopper 162, as shown.

As best shown in FIGS. 5 and 6, the vertical through hole 222 of the intermediate bracket 220 is generally cylindrical and can include diametrically-opposed slots 224. The vertical element 154 is translationally and rotationally received within and extends through the vertical through hole 222. In addition, the vertical through hole 222 and diametrically-opposed slots 224 are shaped and sized such that the key element 164 can pass through them when the key element 164 is correctly (i.e. longitudinally) aligned with said diametrically-opposed slots 224 as shown in FIG. 5.

To couple the vertical element 154 to the intermediate bracket 220, the chain 160 and bottom end of the vertical element 154 are inserted through the intermediate bracket's through hole 222 until an intermediate stopper 168 on the vertical element 154 makes contact with a top surface of the intermediate bracket 220. The stopper 168 prevents the vertical element 154 from sliding further. The buoy 152 is then coupled to a top end of the vertical element 154 and fitted with the top cap or stopper 158. A handle 170 or other user-operable element may be provided at the top of the buoy 152 and connected to the vertical element 154 such that rotation of the handle 170 causes a joint rotation of the vertical element 154 and key element 164 about the rotation axis 166.

Figure 7:
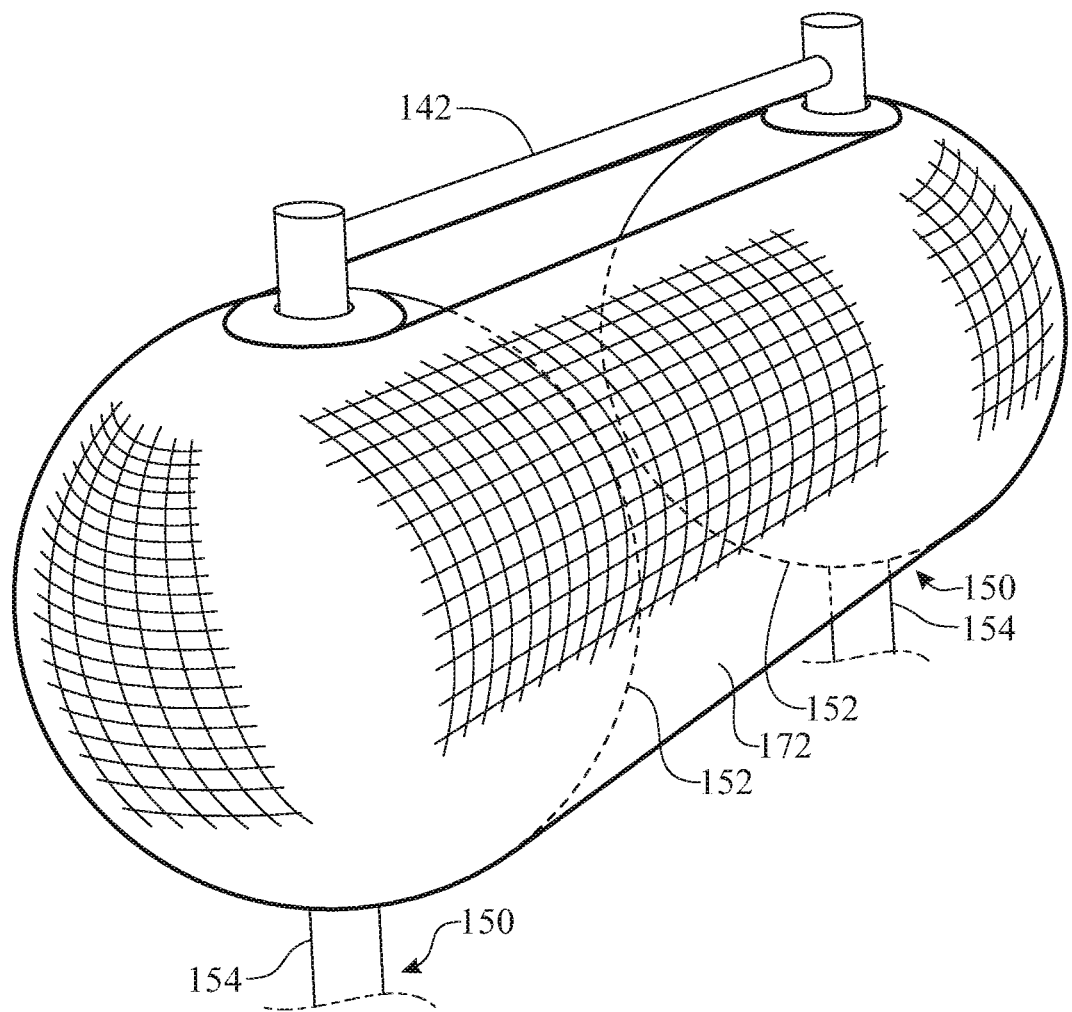
FIG. 7 presents a partial perspective view of a pair of buoys originally illustrated in FIG. 1, wrapped by a wave-energy dissipating mesh.

As shown in FIGS. 1 and 7, some or all of the wave-energy dissipating units comprised in the system 100 may be covered by a mesh, which works as an added countermeasure against large wave trains Wt moving towards a shoreline. More specifically, groups of two or more adjacent buoys may be covered by a mesh, and optionally interconnected by a preferably rigid horizontal member. For example, in the present embodiment, adjacent pairs of buoys 152 of adjacent pairs of second wave-dissipating units 150 provided in the zig-zagged first frame sub-structure are covered and adjoined by a mesh 172. In some embodiments, as shown for instance in FIG. 2, mesh openings 176 on a rear side of the mesh 172 can be smaller than mesh openings 174 on a front side of the mesh 172, allowing the mesh 172 to partially block wave transmission through the mesh 172. Furthermore, as best shown in FIGS. 1, 2 and 7, the adjacent pairs of buoys 152 can be interconnected at a top end thereof by a preferably rigid, transverse horizontal member 142 arranged along a transverse direction perpendicular to the direction of advancement of the wave train Wt. Furthermore, adjacent meshed-covered groups of buoys may be interconnected by a chain, wire, cable or the like; for instance, as best shown in FIGS. 1 and 2, in the present embodiment a chain 144 extends between, and interconnects, the aforementioned adjacent mesh-covered pairs of buoys 152. It must be noted that, for clarity purposes, the mesh 172 has been omitted, for instance, in FIGS. 10 and 11, and the transverse horizontal member 142 has been omitted, for instance, in FIGS. 3-6.

Finally, as best shown in FIG. 1, the system 100 further includes a plurality of front-to-rear catenary chains 112. It must be noted that the catenary chains 112 have been schematically depicted as thick solid lines for clarity purposes. Each front-to-rear catenary chain 112 extends from a front, first wave-energy dissipation unit 120 of a system cell 110 to a rear, first wave-energy dissipation unit 120 of the system cell 110 (i.e. between front and rear wave-energy dissipation units arranged at respective front and rear vertexes of the triangle). Thus, each system cell 110 having two front, first wave-energy dissipation unit 120 and one rear, first wave-energy dissipation unit 120 at respective two front and one rear vertexes of the triangle can include two front-to-rear catenary chains 112. Furthermore, as shown, a front end of each catenary chain 112 is arranged lower than a rear end of the catenary chain 112; for example, the front end of the catenary chain 112 can be connected to the top end 136 of the structural element 134 of the anchor 132 or to a bottom end of the chain 130 of the front, first wave-energy dissipation unit 120, and the rear end of the catenary chain 112 can be connected to the rear, second dual-connector bracket 200 included in the triangular system cell 110 and which is coupled to the rear, first wave-energy dissipation unit 120. In alternative embodiments of the invention, cables, wires or other similar flexible links can be used instead of or in addition to chains. The catenary chains 112 are configured to adopt a catenary shape in rest conditions (FIG. 1) and to stretch when wave trains Wt impact the system 100 and cause the wave-energy dissipation units to move, and more specifically, the rear, first wave-energy dissipation units 120 to buoy rearward relative to the front anchors 132.

A variety of materials may be used to construct the system 100, wherein all or some of said materials can be non-corrosive or water resistant in preferred embodiments of the invention. For instance, in some embodiments of the invention the buoys 122, 152 can be made of foam material, such as, but not limited to, expanded polyurethane having a density of 400 to 500 kg/m3 and a resistance to compression of 85 kg/cm3. Alternatively or additionally, the buoys 122, 152 can be provided with an outer, rough or non-smooth surface. In turn, in some embodiments, the tubular elements disclosed herein, such as the internal hollow tubes 127 and 157 of the buoys 122 and 152, respectively, the vertical elements 124 and 154, and the horizontal members 140 and 142 can be rigid and made for instance of carbon steel (e.g., API 5L/ASTM A53/A106 carbon steel). In addition, the chains, wires, cables or other flexible non-stretchable elongated elements described heretofore, and referred to generically as chains, as well as couplings or fasteners used to secure the chains, can be made for instance of alloy steel grade 80 (class 8) DIN5687. As to the anchor 132, the platform 138 can be made of concrete, and the vertical element 134 can be made of API 5L/STM A53/A106 carbon steel, for instance and without limitation.

The system 100 therefore includes a set of first wave-energy dissipation units 120 having buoys 122 which are allowed to buoy or oscillate in any direction but cannot elevate past a predetermined height given by the maximum elongation of the chain 130. In addition, the system includes a set of second wave-energy dissipation units 150 which, in addition to oscillating, are height-adjustable relative to the foundation site F. The first and second wave-energy dissipation units 120 and 150 are arranged forming adjacent triangular cells or structures (the aforementioned system cells 110), which may be shaped differently in other embodiments of the invention, as described heretofore. The system 100 is secured to the floor or foundation site F by a plurality of anchors 132. The anchors 132 included in the wave-energy dissipation system 100 of the present embodiment are provided at spaced-apart distances from each other in a triangular shaped configuration, as best shown in FIG. 6, and extend between the first wave-energy dissipation units 120 and the foundation site F. All triangles mentioned herein may or may not be equilateral.

Operation of the system 100 is now discussed with reference to FIGS. 1 and 8-11.

As shown in FIGS. 1, 8 and 10, in normal wave height conditions, the system 100 can be adjusted to a lowered position in which the second wave-energy dissipating units 150 are lowered and locked in said lowered position as shown in FIG. 4, and their buoys 152 are arranged substantially at a same depth D1 (FIG. 10) relative to the water surface Ws as the buoys 122 of the first wave-energy dissipation units 120. As wave trains Wt impact the system 100, the system 100 impacts mainly on the low area of the wave train Wt, causing a disorder and slowdown in the waves (i.e. a decrease in the kinetic energy of the waves) relative to a higher area of the wave train Wt, and thus causing the wave train Wt to lose height and potential energy. Specifically, the wave train Wt first impacts the first or front row R of wave-energy dissipation units, formed by first and second wave-energy dissipation units 120, 150, causing the angled horizontal members 140 (i.e. the horizontal members 140 which extend from the two front first wave-energy dissipation units 120 of each system cell 110 to the rear first wave-energy dissipation units 120 of the system cell 110) to translate or shift rearward a limited distance. When the wave train Wt impacts the second or intermediate row R2 of wave-energy dissipation units, formed by second wave-energy dissipation units 150 only, said intermediate row shifts rearward a limited distance. Finally, when the wave train Wt impacts the third or rear row R3 of wave-dissipation units, formed by first and second wave-energy dissipation units 120, 150, the angled horizontal members 140 can no longer move rearward as their axial movement is limited by the rear, second dual-connector brackets 200 in consequence, wave-energy dissipation forces are then transmitted to the foundation site F via the chains 130 and also via catenary chains 112 once the catenary chains 112 have stretched from their initial catenary shape to a straight configuration in which they can no longer stretch and thus begin to transmit wave-energy dissipation forces therethrough towards the foundation site F.

Figure 9:
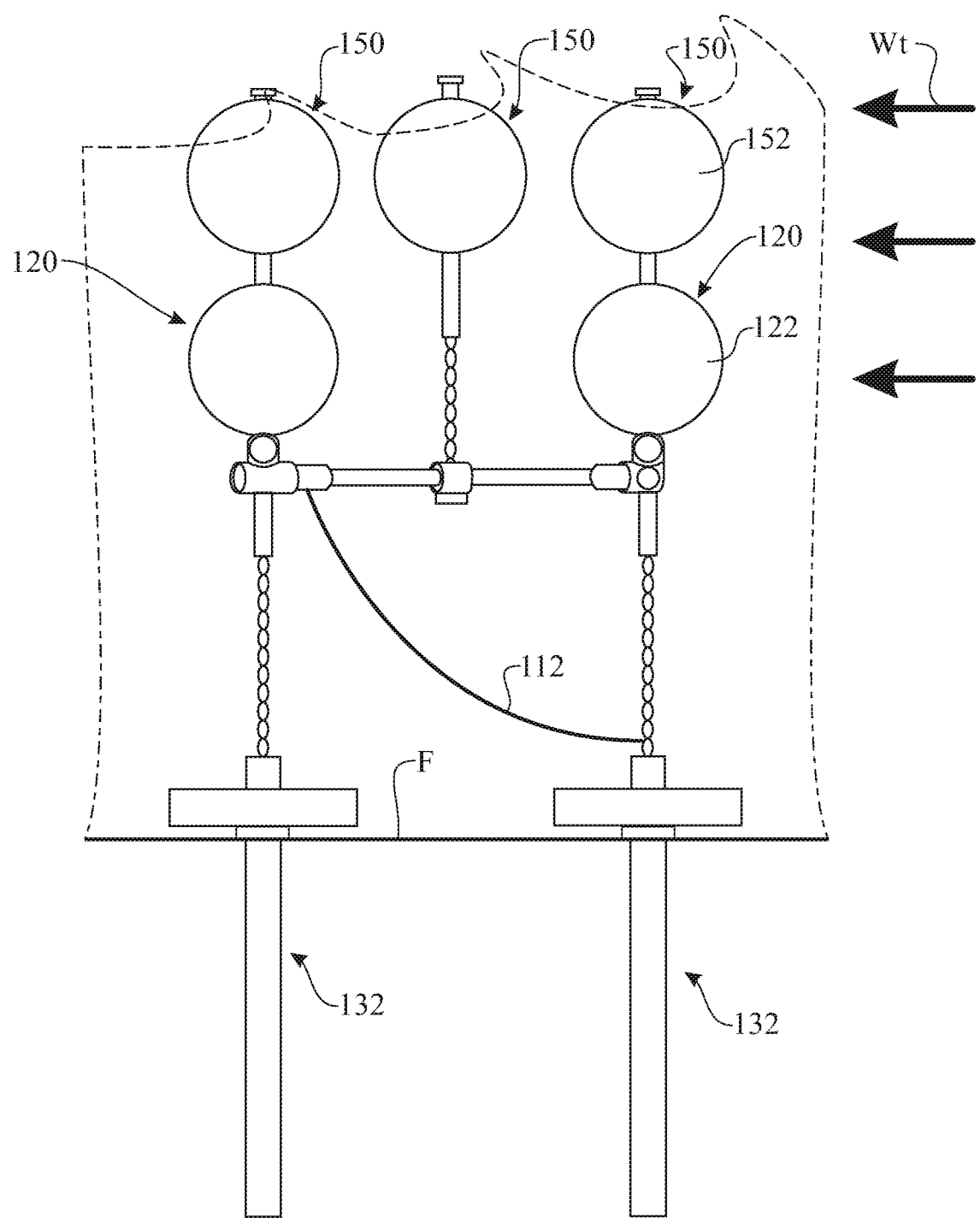
FIG. 9 presents a left side perspective view of the wave-energy dissipation system as illustrated in FIG. 1, having readjusted the system to elevate the second wave-energy dissipation units to partially expose the buoys and adapt the system to dissipate storm wave or rougher wave conditions.
Figure 11:
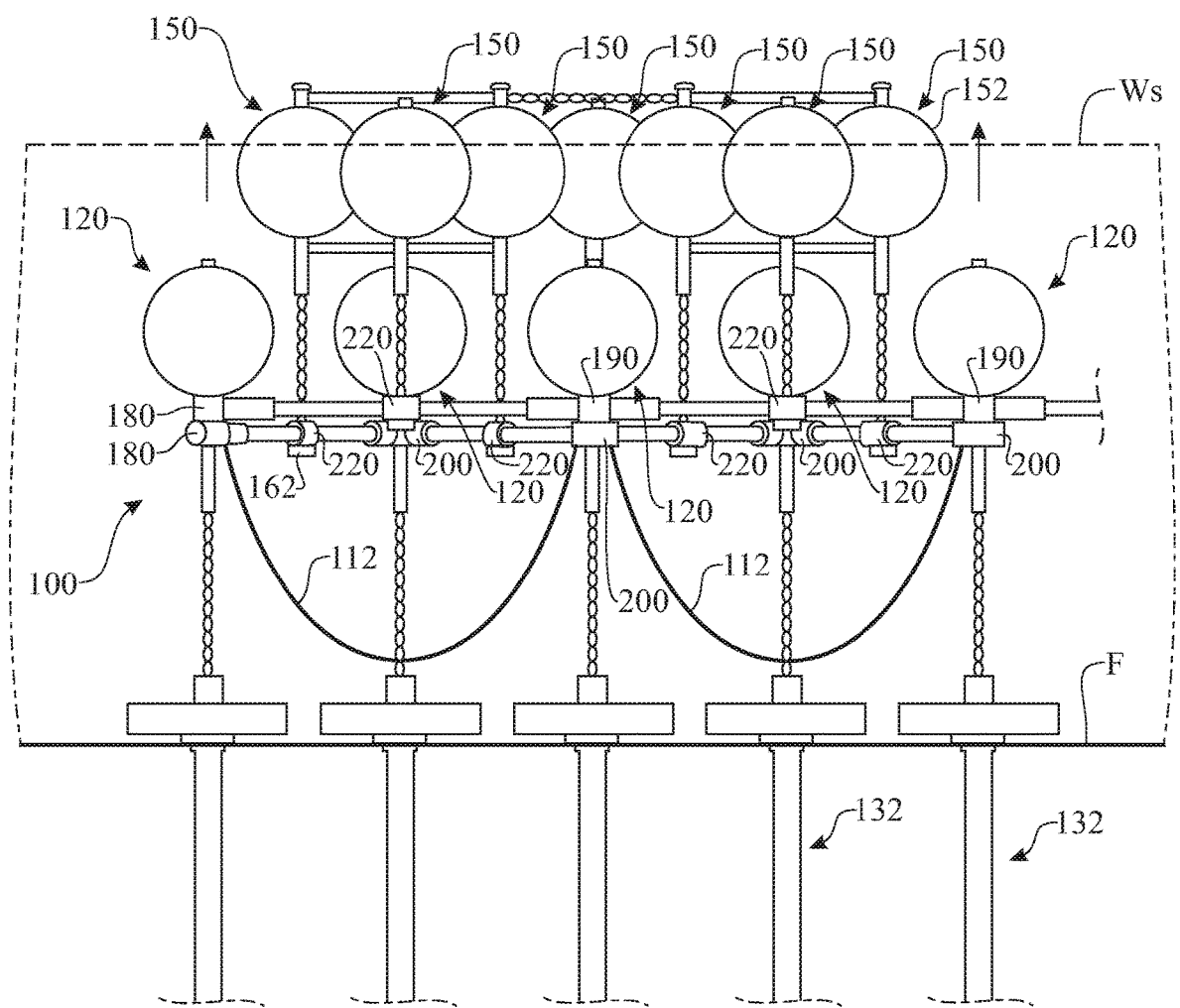
FIG. 11 presents a rear elevation view of the wave-energy dissipation system as illustrated in FIG. 9.

Should storm waves or rough sea conditions be expected, the system 100 may be readjusted to better dissipate higher wave energies that will be caused by such conditions. For this purpose, applicable personnel may dive into the water and operate the handle 170 of each second wave-energy dissipating unit 150 to rotate the key elements 164 into alignment with the diametrically-opposed slots 224 as shown in FIG. 5 and thereby unlock the second wave-energy dissipating unit 150 to elevate relative to the remainder of the system 100 and to the foundation site F. In unlocking the second wave-energy dissipating units 150, buoyancy of the buoys 152 causes the units to automatically rise to the elevated position shown in FIGS. 6, 9 and 11. In this elevated position, the buoys 152 can be partially exposed (i.e. only partially underwater), as shown in FIGS. 9 and 11 to enhance wave-energy dissipation by increasing interference of the elevated buoys 152 with the impacting wave train Wt.

It must be further noted that, if the height-adjustable, second wave-dissipating units 150 are left in the unlocked position of FIG. 5, they become capable of substantially instantly ascending or descending along with the rising or lowering of the waves. I.e., should the wave train height increase, the unlocked buoys 152 may automatically elevate together with the water surface level Ws and adjust to said wave train enlargement. And, contrarily, upon arrival of lower wave height conditions, the unlocked buoys 152 may automatically descend.

In summary, the present disclosure describes a wave-energy dissipation system which is both flexible and displaceable, wherein flexing and displacing of the system take place in unison. By flexible, it is understood that the system distributes incoming load (wave energy) from the front row of wave-dissipating units to the rear row of wave-dissipating units, with remaining wave-energy dissipation forces being transmitted by the stretched chains towards the foundation site F by means of the stretched chains. Because energy dissipation forces are transmitted through angled horizontal members 140, wave energy transmission takes place non-parallel to the wave train Wt, allowing the system to more efficiently break up wave forces into smaller force components so that the different components are absorbed by different elements of the system 100. In addition, the surface texture or roughness of the buoys further contributes to reduce the energy of the impacting wave train Wt. By displaceable, in turn, it is understood that the wave energy Wt moves the buoys in the forward advancement direction, causing displacements, rotations and chain stretching within the system 100 which contribute to reduce the energy of the wave train Wt. Furthermore, when the system 100 has reached its maximum displacement, stretching and rotation points, forces are then transmitted to the foundation site F. In consequence, the system 100 can switch between a rest, floating condition in the absence of waves, and an oscillating, wave-energy-absorbing condition in the presence of waves.

The system is therefore configured to move in the same direction as the wave train to create a drag force, or friction, that facilitates the transfer of some of the energy of the wave train to the system. In consequence, the wave train energy is attenuated as the wave train surpasses the system, contributing to reduce the energy of the wave train that reaches the shoreline and thereby to reduce the likelihood and/or extent of shoreline erosion. This partial attenuation of the wave train is carried by a system that may be comprised of a multiplicity of easy-to-manufacture elements. Further, as mentioned heretofore, the system can be modified to engage waves of different amplitudes and lengths; for instance, the dimensions of the buoys, vertical elements, horizontal elements, mounting brackets, and chains may vary in size and shape. The number of wave-dissipating units and/or rows of wave-dissipation units may vary, such as to adjust the degree of wave train energy absorption. The system may also be provided in a number of network iterations and patterns along the sea floor (e.g., a rectilinear network as shown for instance in the drawings, triangular shaped networks, square-shaped networks, hexagonal-shaped networks, etc.), such as to accommodate wave trains of a more complex geometry (for example, to dissipate energy from a plurality of wave trains advancing in different directions). The system can also be assembled on land and transported out to sea.

Furthermore, while spherical buoys have been illustrated, alternative buoy shapes can be included. In one non-limiting example, one or more of the buoys can include a cylindrical top half and a semi-spherical bottom half.

It is also contemplated that the wave-energy dissipation system may further include a GPS or other geolocation-enabled transponder that alerts vessels in the area so that said vessels are aware of the system's presence.

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A flexible and displaceable wave-energy dissipation system, comprising:
a plurality of wave-energy dissipation units comprising a plurality of first wave-energy dissipation units and a plurality of second wave-energy dissipation units, each first and second wave-energy dissipation unit comprising a respective buoy, wherein each second wave-energy dissipation unit is height-adjustable relative to the first wave-energy dissipation units to vary a relative vertical separation between the buoy of said each second wave-energy dissipation unit and the buoys of the first wave-energy dissipation units;
a structure; and
at least one anchor configured to secure the wave-energy dissipation system to a floor or foundation site, wherein
the first and second wave-energy dissipating units are movable relative to one another and relative to the at least one anchor, wherein movement of the first wave-energy dissipating units relative to one another and relative to the anchor is limited; and further wherein
the plurality of wave-energy dissipation units is divided into at least two groups of wave-energy dissipation units, wherein each group is arranged at a different distance from a front side of the wave-energy dissipation system configured to face an impacting wave train; wherein
the at least two groups of wave-energy dissipation units comprise a front row of alternating first and second wave-energy dissipation units, a rear row of alternating first and second wave-energy dissipation units and an intermediate row of second wave-energy dissipation units, wherein the front row is arranged frontward of the intermediate row and the intermediate row is arranged frontward of the rear row such that the front row is encountered by the impacting wave train before the intermediate row is encountered by said impacting wave train, and such that the intermediate row is encountered by the impacting wave train before the rear row is encountered by said impacting wave train; wherein
the front row and rear row are secured to the floor or foundation site by the at least one anchor, and the structure is connected to the front and rear row and carries the intermediate row; and further wherein
the wave-energy dissipation units of the front, intermediate and rear rows form a triangular-cell pattern, each triangular cell comprising six wave-energy dissipation units respectively arranged at a first vertex of the triangular cell, a second vertex of the triangular cell, a third vertex of the triangular cell, a first intermediate position on a first side of the triangular cell between the first and second vertexes, a second intermediate position on a second side of the triangular cell between the second and third vertex, and a third intermediate position on a third side of the triangular cell between the first and third vertexes, wherein the wave-energy dissipation units of the first and third intermediate positions form the intermediate row, and the wave-energy dissipation units of the first, second and third vertexes and second intermediate positions form the front and rear rows.

2. The wave-energy dissipation system of claim 1, wherein each wave-energy dissipation unit of the plurality of second wave-energy dissipation units is carried by the structure and is vertically translatable relative to the structure to vary a vertical position of the buoy of said each wave-energy dissipation unit of said plurality of second wave-energy dissipation units, such that said each wave-energy dissipation unit of said plurality of second wave-energy dissipation units may adopt a first vertical position and a second vertical position lower than the first vertical position.

3. The wave-energy dissipation system of claim 2, wherein the plurality of second wave-energy dissipation units comprises the wave-energy dissipation units arranged at the first, second and third intermediate positions.

4. The wave-energy dissipation system of claim 2, wherein the buoy of said each wave-energy dissipation unit of said plurality of second wave-energy dissipation units in the second vertical position is arranged at a same height as the buoys of the wave-energy dissipation units of said plurality of first wave-energy dissipation units.

5. The wave-energy dissipation system of claim 2, wherein said each wave-energy dissipation unit of said plurality of second wave-energy dissipation units is configured to adopt an unlocked configuration relative to the structure, wherein in the unlocked configuration said each wave-energy dissipation unit of said plurality of second wave-energy dissipation units is freely translatable vertically upward or downward relative to the structure responsively to upward or downward buoyancy of the buoy of said each wave-energy dissipation unit of said plurality of second wave-energy dissipation units.

6. The wave-energy dissipation system of claim 2, wherein said each wave-energy dissipation unit of said plurality of second wave-energy dissipation units is lockable in the second vertical position such that said each wave-energy dissipation unit of said plurality of second wave-energy dissipation units may remain in said second vertical position counteracting buoyancy of the buoy of said each wave-energy dissipation unit of said plurality of second wave-energy dissipation units.

7. The wave-energy dissipation system of claim 2, wherein the wave-energy dissipation units of the plurality of first wave-energy dissipation units are non-height-adjustably connected to the structure.

8. The wave-energy dissipation system of claim 7, wherein the plurality of first wave-energy dissipation units comprises the wave-energy dissipation units arranged at the first, second and third vertexes.

9. The wave-energy dissipation system of claim 7, wherein the wave-energy dissipation units of the plurality of first wave-energy dissipation units are secured to the floor or foundation site.

10. The wave-energy dissipation system of claim 1, comprising at least one flexible, elongated member extending between a first group of said at least two groups and a second group of said at least two groups, wherein the flexible elongated member is configured to elongate to a maximum length thereby limiting movement of the first and second groups relative to one another.

11. The wave-energy dissipation system of claim 10, wherein the flexible elongated member comprises at least one catenary elongatable to said maximum length.

12. The wave-energy dissipation system of claim 1, wherein the front, rear and intermediate rows are arranged along a longitudinal direction generally perpendicular to a direction of displacement of the impacting wave train.

13. The wave-energy dissipation system of claim 1, further comprising an energy dissipation mesh enclosing at least one buoy and configured to allow passage of the wave train therethrough.

14. The wave-energy dissipation system of claim 13, wherein the energy dissipation mesh encloses a plurality of buoys of the wave-energy dissipation units of the intermediate row.

\* \* \* \* \*